July 12, 1960  G. SIGGINS  2,944,517
FEED HOPPER AND DISPENSING DEVICE
Filed Oct. 14, 1957
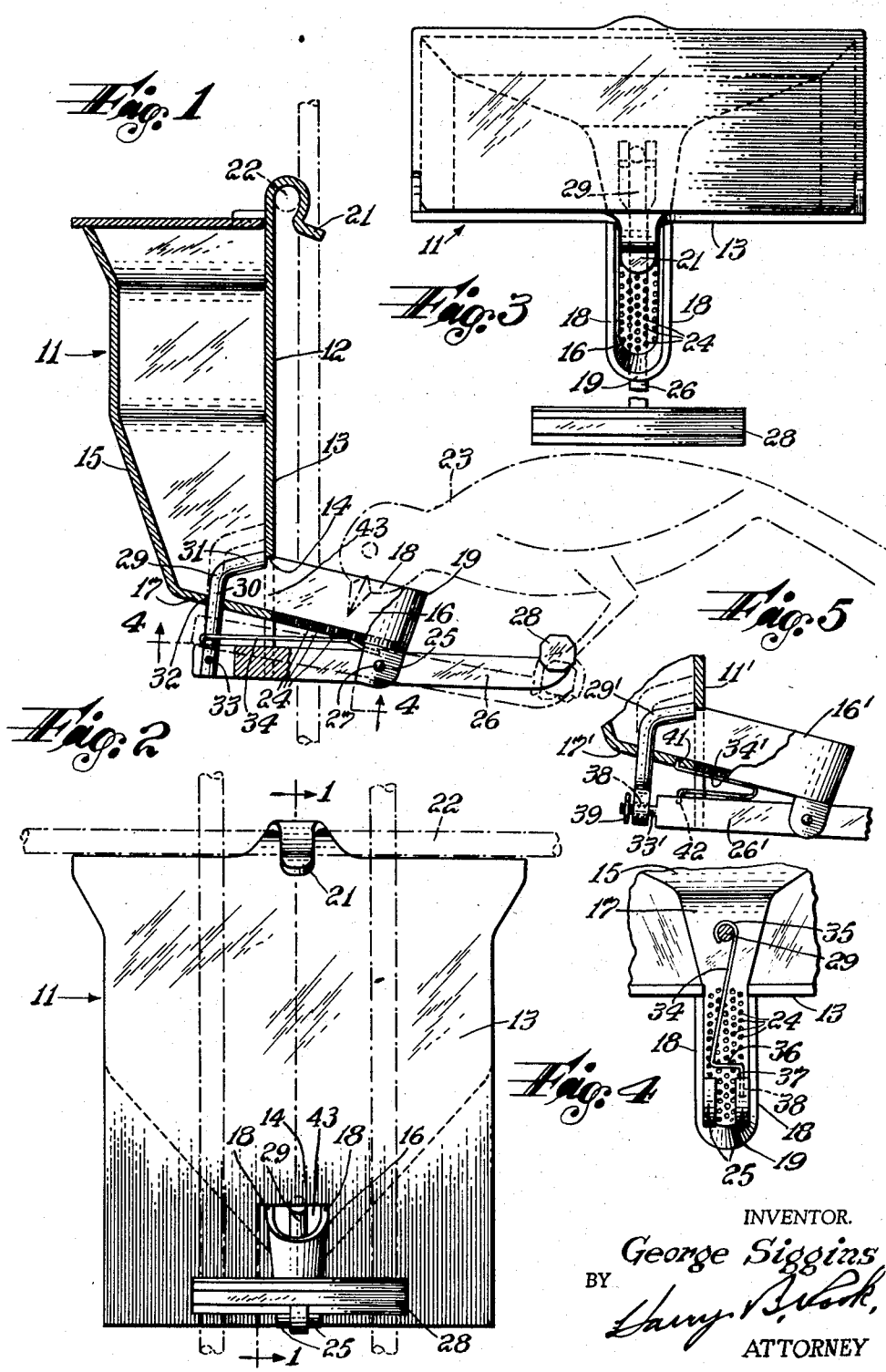
INVENTOR.
George Siggins
BY
ATTORNEY

United States Patent Office 2,944,517
Patented July 12, 1960

2,944,517

FEED HOPPER AND DISPENSING DEVICE

George Siggins, 8 Elmwood Drive, Livingston, N.J.

Filed Oct. 14, 1957, Ser. No. 689,818

6 Claims. (Cl. 119—55)

This invention relates to a novel hopper and dispenser device intended to be useful for the feeding of birds, particularly caged birds, although features of the invention may be employed in the feeding of other animals or in the general dispensing of materials or particles from a container.

In using an ordinary bird seed hopper, one has to rely on gravity alone to get the seed to a trough or other feeding location. When relying on gravity, there is a tendency for the seed, or other food, to clog at the hopper exit or the aperture through which the food flows into trough, such an exit being the critical part or bottle neck of the feeder.

In accordance with my invention, I overcome this trouble by the use of a barrier-agitator that breaks up any clogging as it moves and then positions itself at a most advantageous point to act as a barrier so that the flow of seed or the like comes from two sides at the bottom of said barrier. Also, the usual bird seed hopper has to be placed in front of a stationary cage perch if used for feeding a caged bird. In accordance with my invention, I have a perch as part of the hopper itself, so that it can be placed in any part of the cage.

A bird seed hopper usually fills up with dust-like particles caused by the bird in the process of removing the hulls and eating the seed. I eliminate such debris by having a screen in the bottom of said trough, as well as by having the trough downwardly inclined so that the feed rolls along, causing the small particles to fall to the bottom and out through the holes in the screen and into the cage. Also, in accordance with my invention, I provide for filling the hopper without disengaging it from the cage and may prevent seed hulls from falling outside of the cage by having a skirt extending along the outside of the cage and below the trough. Also, in accordance with my invention, a box of seed may be placed in the hopper and the contents thereof dispensed directly therefrom. The feed hopper and dispensing device embodying the invention includes an upper rectangular section to receive a seed box and a lower inverted frusto-pyramidal section so that seed can never remain in the corners or elsewhere in the hopper as the older seed is funneled out of the hopper before new seed reaches the discharge aperture or exit, thereby to provide the bird with fresh and wholesome seed at all times and to prevent the box of seed from falling below the upper rectangular section of the hopper in such a manner as to interfere with the exit aperture or with the operation of seed agitating means to be hereinafter described.

An object of my invention is to provide a bird feeder with a trough extending from an orifice in the wall of a container thereof diagonally downward from the outer surface of said wall and into a cage holding the bird, said trough being desirably formed to screen debris from the seed as it is used.

Another object of my invention, is to provide a bird feeder in which the trough for feeding seed to a bird has lugs depending from the bottom thereof with a perch bar straddled intermediate its ends by the lugs, pivoted thereto, and its motion limited by trough engagement.

A further object of my invention is to provide such a perch bar at its back or perch-remote end with a barrier-agitator, the upper end of which is bent to extend along or engage the inner surface of the body wall of the container and which is articulated at its lower end with respect to said perch-bar, whereby the engagement or disengagement of a bird with respect to the perch effects movement of the seed agitator to insure the desired feeding of the contents of the container to the bird.

A still further object of my invention is to provide a spring acting on said perch bar to return it to normal position after the bird has left the perch, said return to normal position also moving the agitator bar to its lower or most effective obstructing position.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views;

Figure 1 is a vertical sectional view with parts in elevation of a feed hopper and dispensing device, on the line 1—1 of Figure 2, in the direction of the arrows.

Figure 2 is an elevational view of said hopper and dispensing device from its right as viewed in Figure 1.

Figure 3 is a plan of the device as shown in Figures 1 and 2.

Figure 4 is a bottom sectional view on the line 4—4 of Figure 1, in the direction of the arrows, the perch bar having been removed.

Figure 5 is a fragmentary view corresponding generally to a lower portion of Figure 1, but showing a modification.

Referring to the drawings in detail and first considering the embodiment of my invention illustrated in Figures 1 to 4, inclusive, there is shown a feed hopper 11 formed as a four sided container tapering at some portions from top to bottom and presenting a generally inverted frusto-pyramidal appearance. However, as will be seen particularly in Figures 1 and 2, the intermediate portion of the container preferably has normally vertical sides, forming a generally rectangular section 12. From the section 12 one wall only, that is the one designated 13, extends normally vertically and has a slot 14, at its lower edge. The opposite wall 15 below the rectangular section 12 extends diagonally downward and inward, terminating in a trough 16 that, with the slot 14, forms a food exit aperture 43.

The lower wall 17 of said trough 16 comprises the bottom of the container 11 and extends through the slot 14 to provide a food exit aperture; and the side walls 18 of the trough extend upwardly therefrom, being united at the extreme end by a curved portion 19 and at their other ends terminating at the vertical wall 13 at opposite sides of said exit aperture. The upper edge of the vertical wall 13 is desirably provided with a hook 21, or other device, for supporting the hopper from a cage 22 or other supporting means, so that the trough 16 then projects inside the cage to be accessible to a bird designated 23.

The lower wall 17 of the trough, especially that part inside of the cage 22, is desirably foraminous or provided with a number of small holes 24 for screening dust-like particles from the feed, said holes, however, being so small that seeds or other feed will not pass therethrough. Depending from the bottom of the trough 16 are a pair of bearing lugs 25. Straddled by these bearing lugs is a perch bar 26, the intermediate portion of which receives a pivot pin 27 which passes through said lugs. The inner end portion of the bar 26, or that beyond the trough 16, is provided with a perch 28 on which the bird 23 may be supported.

A barrier-agitator 29 is carried by the other end of the perch bar, or that beneath the trough 16. The upper end 31 of said agitator 29 is curved or bent at an angle to the lower generally vertical portion, so that its extreme upper portion extends along or engages the inner surface of the wall 13. The lower portion 31 of the agitator extends through an aperture 32 in the wall 17 loosely enough for its free reciprocating motion, but not loose enough to allow seed to pass thereby. The lower end portion of the agitator is articulated with respect to the perch-remote end portion of the bar 26. In the embodiment of Figure 1, this is shown effected by bifurcating the perch-remote end portion of the bar 26, so that it straddles the lower portion of the agitator 29 which is shown in the form of a rod. Connection between said agitator lower portion and said bar 26 is shown effected by a pivot pin 33 passing through registering apertures in said agitator end portion and the bifurcations of the bar.

In order to hold the bar 26 in the normal position illustrated in full lines in Figure 1, I provide resilient means urging said bar to that position. In the embodiment of Figures 1 to 4, inclusive, this means takes the form of a piece of spring wire 34, one end of which is bent around the lower portion of the agitator 29, as indicated at 35, the intermediate portion is bent laterally, as indicated at 36, and engages the lower surface of the wall 17, while the other end portion 37 is bent at right angles to the portion 36 and held in an appropriate aperture or pocket 38 in one of the lugs 25 of the trough 16.

Referring now to the embodiment of Figure 5, we have a construction generally like that of the Figures 1 to 4, inclusive, except that the agitator-engaging end of the bar 26', instead of being bifurcated and apertured, is reduced in section to form a small cylindrical stud indicated at 33', while the lower end portion of the agitator 29' is correspondingly apertured, as indicated at 38, to loosely receive the stud portion 33', thereby effecting the desirable articulation. Retention of the agitator 29' on the portion 33' may be effected by suitable locking means, such as a cotter pin 39 passing through the portion of the stud extension 33' beyond the agitator 29'.

In either embodiment, we may also have a slightly different form of spring 34' which is generally U-shape in elevation and held in position by an angular extension 41 at the end of one of its arms received in a corresponding aperture or pocket in the wall 17 or 17' of the container, and an angular extension 42 at the end of the other arm received in a corresponding aperture or pocket in the perch bar 26 or 26'. The use of the spring 34', however, is similar to that of the spring 34 of the first embodiment; that is, it acts to hold the perch bar 26 or 26' in a position corresponding with the full line position of the bar 26 in Figure 1.

The operation of the device will now be be described. Upon placing a supply of feed or bird seed in the storage bin 11 or 11', a portion thereof will flow past the barrier-agitator, 29 or 29' into the trough 16 or 16'. The remainder will clog and the flow of seed stop. A bird alighting upon the perch 28, or the corresponding perch on the bar 26', will depress the perch and move the bar, 26 or 26', to the dot-dash line position of Figure 1, correspondingly raising the agitator 29 or 29' from the full line position to the dot-dash line position.

This movement will start a flow of seed or other food from the hopper into the trough, which flow, however, will be only momentary and stop when movement of the bar stops. The bird will then be free to eat the seed or other food in the trough, whereupon it will presumably depart allowing the bar to move from the dot-dash line position to the full line position of Figure 1. This release will also effect some agitation of the feed in the hopper, starting a momentary flow therefrom, whereupon if the bird is still hungry, it will be attracted by the added amount of seed or other feed in the trough and return to its perch for a repetition of the operation.

Having now described my invention in detail in accordance with the requirements of the patent statutes, those skilled in this art will have no difficulty in making changes and modifications in the individual parts or their relative assembly in order to meet specific requirement or condition. Such changes and modifications may be made without departing from the scope and spirit of the invention, as set forth in the following claims.

I claim:

1. In a feed hopper and dispensing device, a container for the feed to be dispensed having a bottom wall and side walls, means on the container for supporting said container on a cage with one of said side walls approximately vertically disposed, said side wall having a food exit aperture at the bottom of the container, a trough inclined downwardly from said aperture and outwardly from said side wall, a bar pivotally mounted intermediate its ends on and beneath the trough, the portion of said bar beyond the outer end of said trough having a portion to be engaged by an animal and being movable in one direction by engagement of said portion by animal, a barrier-agitator extending vertically across and partially blocking said aperture, the upper portion of said agitator extending along said wall of the container above and adjacent said exit aperture, the bottom wall of said container having an opening therethrough and the lower portion of the agitator slidably projecting through said opening in the bottom wall of the container and being articulated with respect to the end portion of said bar remote from said end to be actuated, and spring means acting on said remote portion of the bar and disposed between it and the lower surface of said trough to normally bias said bar in the other direction after disengagement of the bar by an animal, whereby the barrier-agitator is reciprocated upon pivotal movement of said bar in one direction by an animal and in the opposite direction by said spring means.

2. The invention as recited in claim 1, wherein said remote end portion of the bar is bifurcated, straddles the lower portion of the barrier-agitator, and pivot means passes through the bar bifurcations and the straddled portion of said agitator.

3. The invention as recited in claim 1, wherein said remote end portion of the bar is terminated as a stud relatively small in diameter, and the lower end portion of said barrier-agitator is formed with an aperture in which said stud is loosely received.

4. The invention as recited in claim 1, wherein the spring means is a wire spring one end of which curves around the barrier-agitator, the intermediate portion of which extends transversely in engagement with the bottom wall of said trough, and the other end portion of which is bent at an angle thereto and received in an appropriate pocket in a depending portion of said trough.

5. The invention as recited in claim 1, wherein the spring means is generally U-shape in elevation and held in position by an angular extension at the end of one of its arms received in a corresponding pocket in the container and an angular extension at the end of its other arm received in a corresponding pocket in the bar.

6. In a feed hopper and dispensing device, a container for the feed to be dispensed having a bottom wall and side walls, a hook projecting from one of said side walls for supporting said container on a cage with said wall approximately vertically disposed, said side wall having a food exit aperture at the bottom of the container, a trough inclined downwardly from said aperture and outwardly from said side wall to carry feed into a cage whereon the container is suspended, a pair of lugs depending from the bottom of said trough, a perch bar disposed below said trough and pivotally connected to said lugs, the perch portion of said bar being disposed beyond the outer end of said trough for supporting a bird, a barrier-agitator comprising a rod the upper portion of which extends at an angle to the lower portion toward the inner surface of said wall and above and adjacent said aperture while the lower portion thereof projects through the bottom wall of said container and is articulated with respect to the perch-remote end portion of said bar, so that the bar will be moved about its pivot and the barrier-agitator will be actuated in one direction when a bird alights upon the perch, and spring means acting on said perch-remote portion of the bar and disposed between it and the lower surface of said trough to actuate the bar and said barrier-agitator in the opposite direction as a bird leaves the perch.

References Cited in the file of this patent

UNITED STATES PATENTS

| | | |
|---|---|---|
| 1,299,719 | Harris | Apr. 8, 1919 |
| 1,530,101 | Ashing | Mar. 17, 1925 |
| 1,733,831 | Sommers | Oct. 29, 1929 |
| 2,532,726 | Lajoie et al. | Dec. 5, 1950 |
| 2,591,459 | Meany | Apr. 1, 1952 |
| 2,773,474 | Dodds | Dec. 11, 1956 |

FOREIGN PATENTS

| | | |
|---|---|---|
| 289,033 | Great Britain | July 26, 1928 |
| 184,554 | Switzerland | Aug. 17, 1936 |